United States Patent [19]
Rinker

[11] Patent Number: 5,614,231
[45] Date of Patent: Mar. 25, 1997

[54] BACK-SIDE DIE AND DIE SET FOR MOLDED DOOR FACINGS

[75] Inventor: William E. Rinker, New Albany, Pa.

[73] Assignee: Masonite Corporation, Chicago, Ill.

[21] Appl. No.: 382,390

[22] Filed: Feb. 1, 1995

[51] Int. Cl.$^6$ ............................................. B29C 43/36
[52] U.S. Cl. .................. 425/394; 264/257; 264/320; 264/322; 425/403; 425/412
[58] Field of Search .............................. 425/394, 395, 425/403, 408, 412; 264/257, 258, 320, 322

[56] References Cited

U.S. PATENT DOCUMENTS 2,204,263  6/1940  Thoresen ........................... 425/398
3,546,841  12/1970  Smith et al. .
4,236,365  12/1980  Wheeler .
5,075,059  12/1991  Green ................................. 264/257

Primary Examiner—Jay H. Woo
Assistant Examiner—Joseph Leyson
Attorney, Agent, or Firm—Marshall, O'Toole, Gerstein, Murray & Borun

[57] ABSTRACT

A die set for molding a building product with a convex corner formed at the intersection of two surfaces slanting downward from a convex corner includes a back-side die with a push that includes a triangular surface extending to an apex above and inwardly of the intersection of the lines forming the edges of the corner. The push also includes two other quadrilateral surfaces that extend outwardly of the intersection of the lines that form the lower edges of the slanting surfaces.

8 Claims, 4 Drawing Sheets

BACK-SIDE DIE AND DIE SET FOR MOLDED DOOR FACINGS

BACKGROUND OF THE INVENTION

1. Field of the Invention

The invention relates generally to the manufacture of molded building products, and more particularly to dies used to manufacture molded door facings that include sharp convex corners, such as facings that may be attached to a frame to create a six-panel door.

2. Description of Related Technology

It is known that an approximately ⅛" thick door facing can be molded by compressing an approximately ¾" to 1" thick rigid fiberboard mat between matched front- and back-side dies.

In making such a facing, the front-side die carries the desired profile of the door and any desired grain pattern. The back-side die has been traditionally configured to provide equal density consolidation of the fiberboard mat throughout the facing. Equal consolidation has been found to be desirable because two similar portions of the facing consolidated unequally will generally have different physical characteristics.

In cases where the desired profile of the facing does not have steeply-slanted surfaces, nearly equal consolidation of the mat throughout the facing can be obtained by matching the profile of back-side die nearly exactly to the profile of the front-side die.

In cases where the desired profile of the facing does have steeply-slanted surfaces, back-side dies are sometimes designed with minor planar offsets in starting points or end points for the slanted surfaces. These offsets result in a slight decrease in the degree of consolidation of the fiberboard mat in the slanted surfaces, but are thought to be necessary to help assure that there is enough material in the slanted surface to provide necessary strength. (The need for offsets can be understood by considering the result if a facing was designed with a surface slanted at 90°. A back-side die with exactly the same profile as the front-side die would shear the product at the 90° surface.)

There has been a consistent problem in achieving high fidelity of the front side of a facing to the front-side die, particularly in areas corresponding to convex corners in the desired profile. When sharp convex corners are incorporated into a die, it is common that the molded facings do not faithfully reproduce the desired corner, but instead tend to have a rounded, "soft" corner. Thus, it has been difficult to convincingly reproduce the appearance of a natural wood six-panel door or other natural wood door having sharp convex corners in a door made from molded facings.

SUMMARY OF THE INVENTION

It is an object of the invention to overcome this problem.

Accordingly, the invention provides a back-side die that improves the fidelity of a molded facing to the profile carried by the front-side die. The invention is particularly useful in reproducing the appearance of a natural wood paneled door.

According to the invention, the back-side die is provided with a "push" that includes not only planar offsets from the profile of the front-side die, but also a vertical offset from the profile of the front-side die.

Other objects and advantages of the invention will be apparent to those skilled in the art from the following detailed description, taken in conjunction with the drawings and appended claims.

DETAILED DESCRIPTION OF A PREFERRED EMBODIMENT

Figure 1:
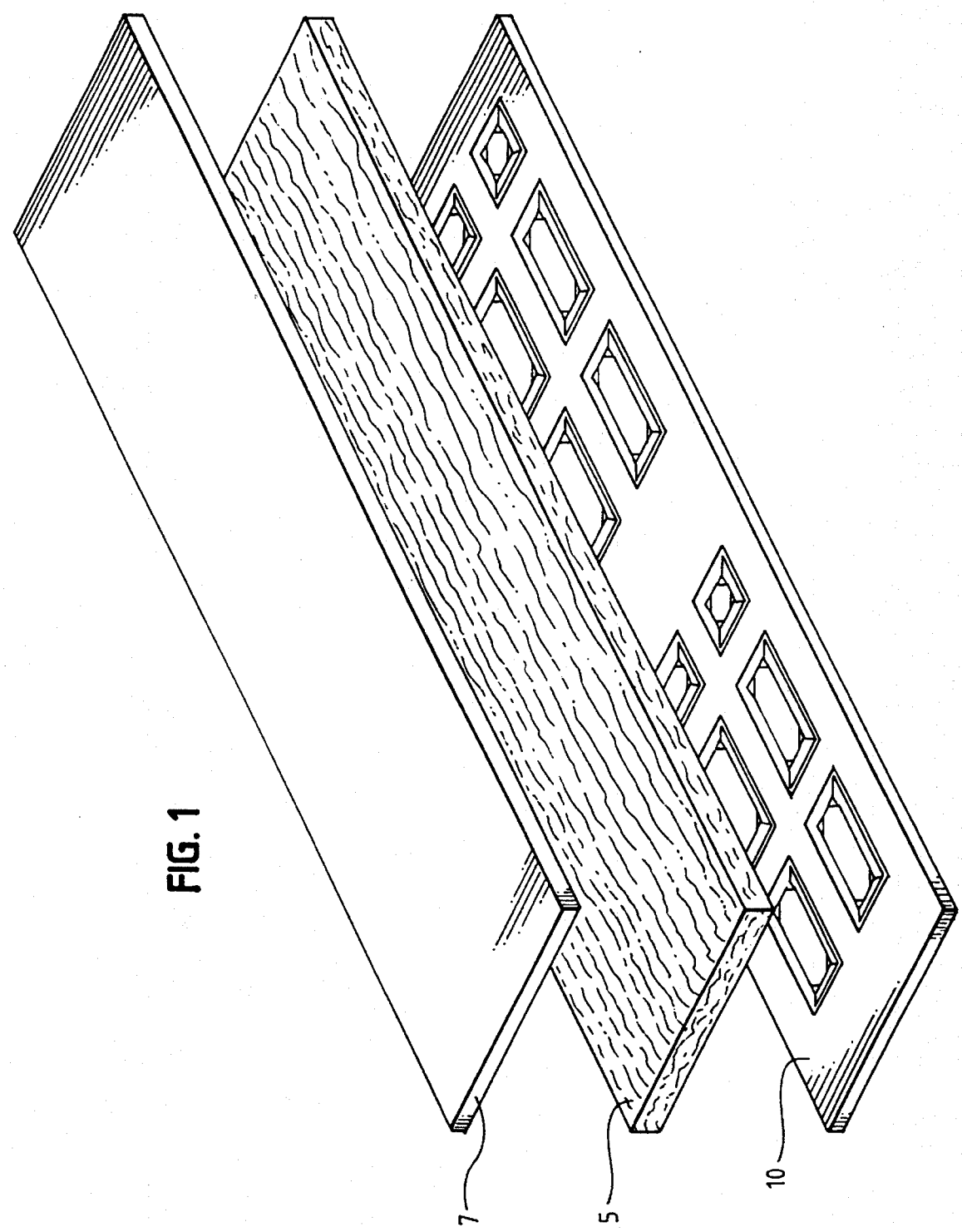
FIG. 1 is a perspective view of a die set in accordance with the present invention and a rigid fiberboard mat for use in making a longitudinally-connected pair of molded door facings.

FIG. 1 shows a rigid fiberboard mat 5 to be used in the manufacture of a molded door facing. The mat is positioned between a front-side die 7 and a back-side die 10. The side (not shown) of the front-side die 7 facing the mat 5 bears the profile and grain texture of a wood door. The back-side die 10 has a similar profile, but does not have any grain pattern.

Figure 2:
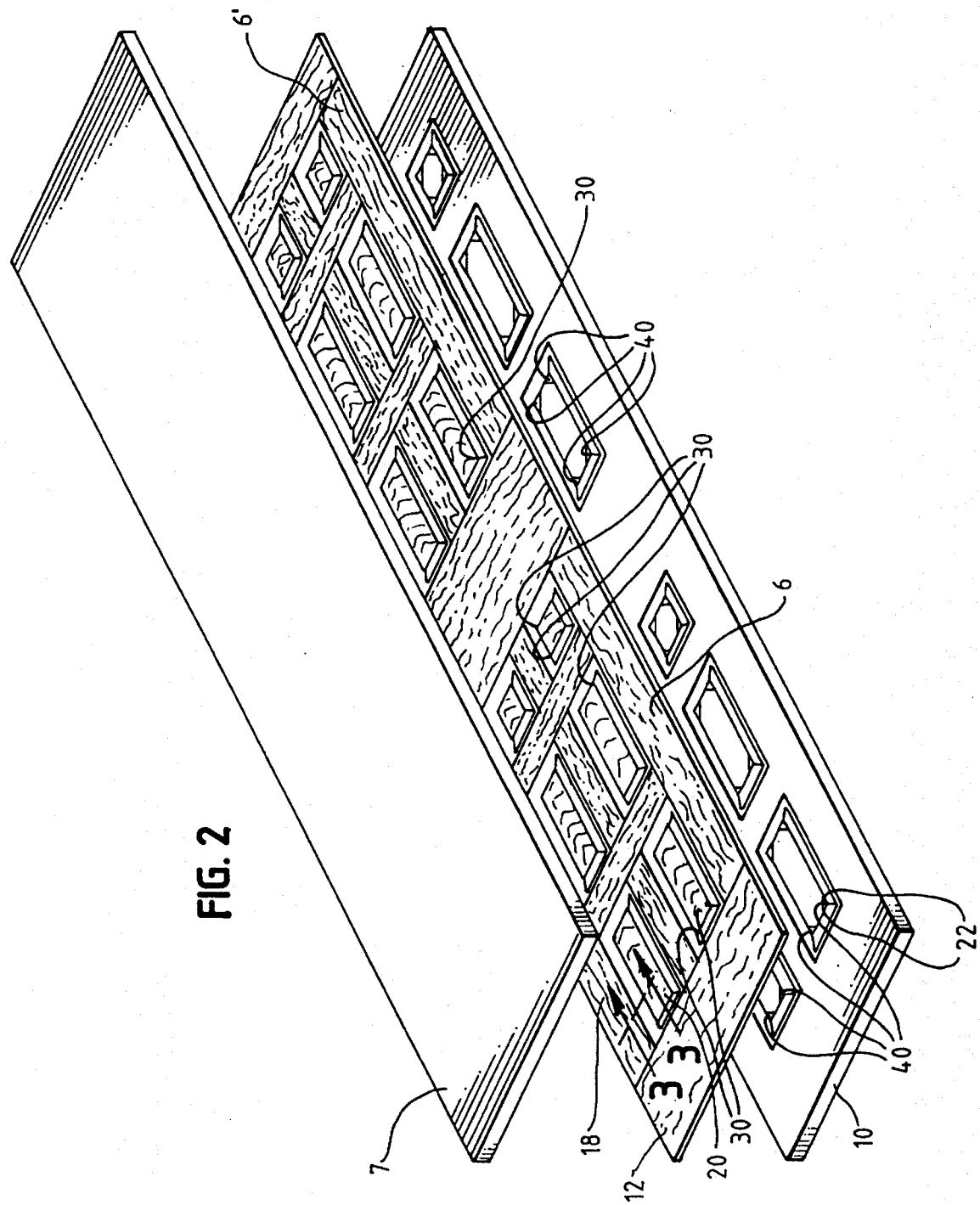
FIG. 2 is a perspective view of the die set of FIG. 1 and the connected pair of molded door facings made from the mat of FIG. 1 using the die set.

FIG. 2 shows the same fiberboard mat 5 after it has been molded in the front- and back-side dies 7 and 10 under heat and pressure into a pair of longitudinally-connected door facings 6 and 6'. As shown, the profile and grain pattern borne on the front-side die 7 has been transferred to a front side 12 of the facings. The facings can be cut apart and attached to opposite sides of a frame (not shown) to create a door. For clarity, reference will be made hereafter to a single facing 6.

Figure 3:
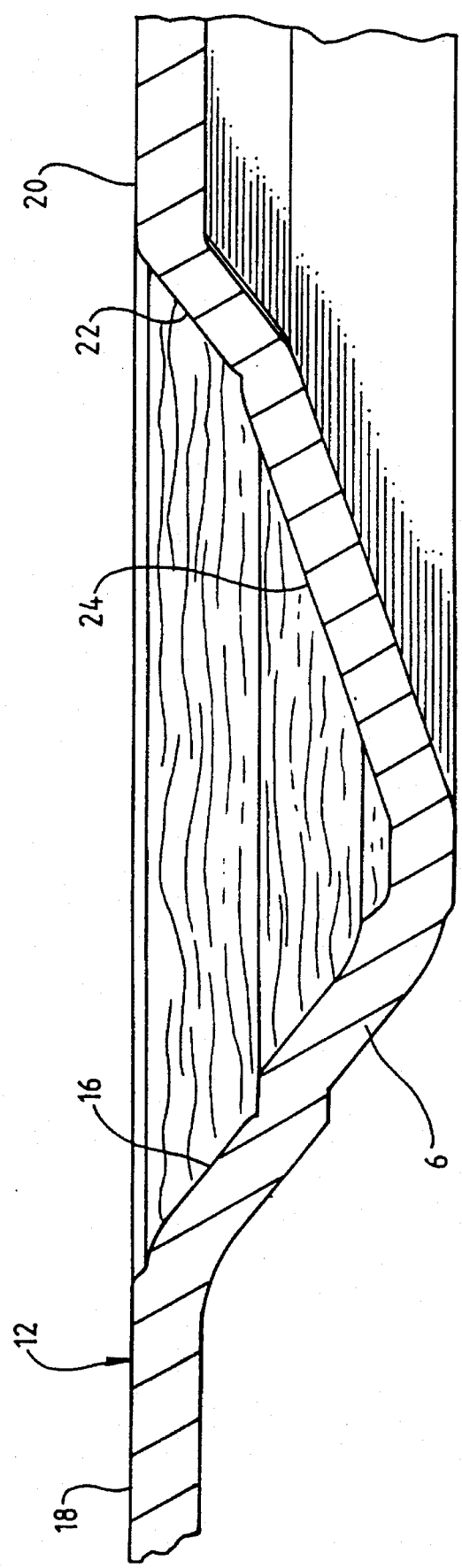
FIG. 3 is an enlarged, fragmentary cross-section of a portion of one of the molded door facings of FIG. 2 taken through line 3—3.
Figure 4:
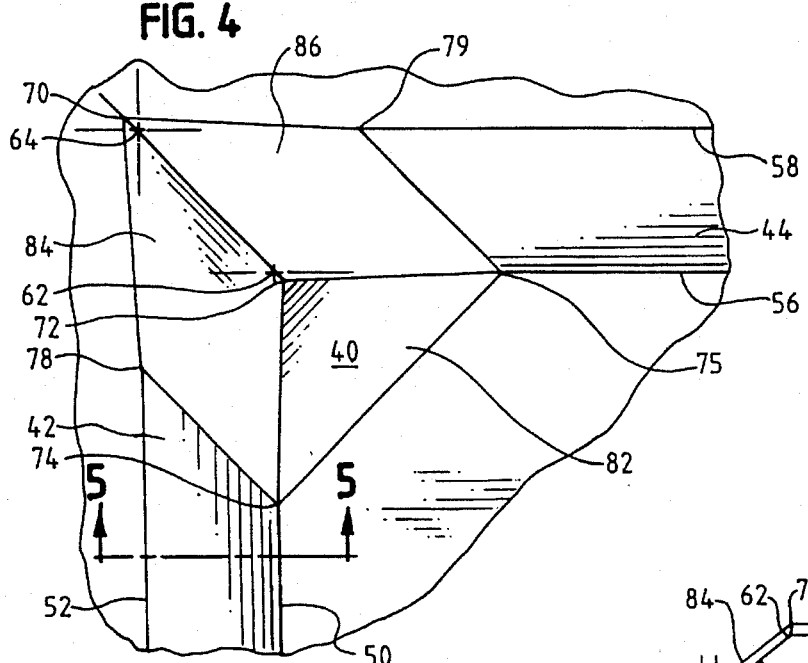
FIG. 4 is an enlarged plan view of a push in accordance with the present invention.
Figure 5:
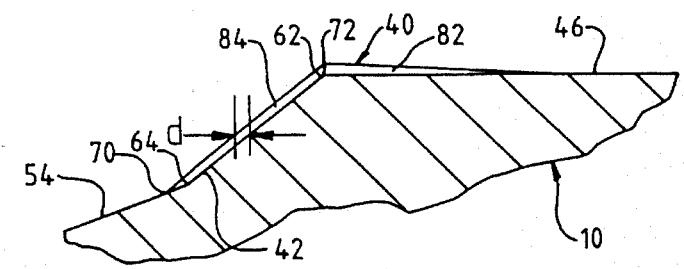
FIG. 5 is a profile view of the push of FIG. 4 taken through lines 5—5.
Figure 6:
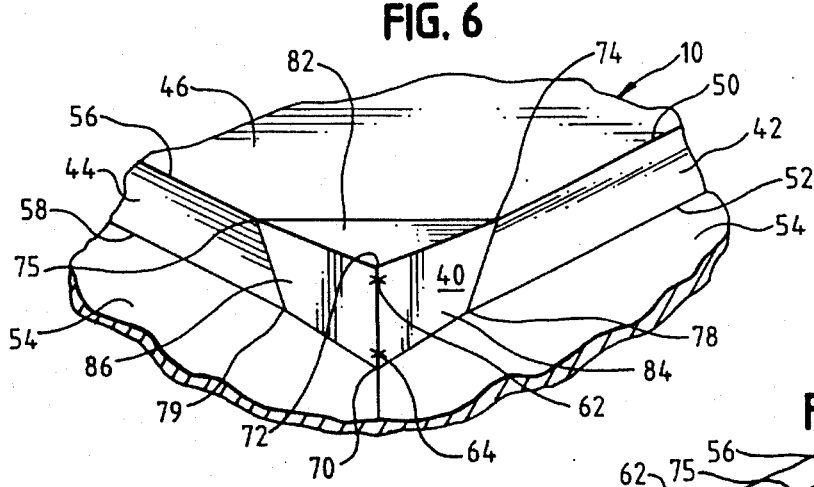
FIG. 6 is a perspective view of the push of FIGS. 4 and 5.
Figure 7:
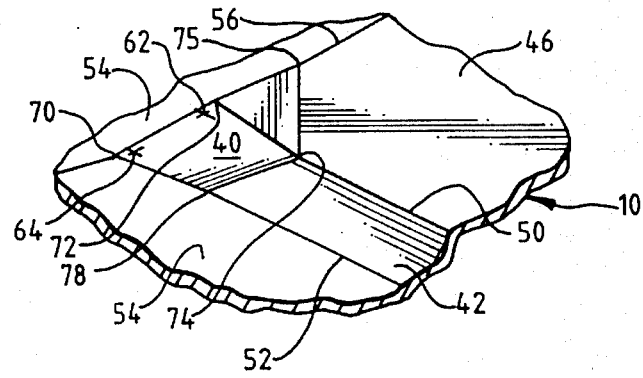
FIG. 7 is a rotated perspective view of the push of FIG. 6.

As shown in FIG. 3, the molded facing 6 has a relatively uniform thickness of approximately ⅛". A bead-and-cove portion 16 on the front side 12 of the facing slants downward from a stile or rail portion 18. The front side 12 of the facing also includes a planar raised panel portion 20 and two descending surfaces 22 and 24. As illustrated, the descending surface 22 descends approximately ¼" into the facing at approximately a 38° angle from the plane of the panel portion 20.

As seen in FIG. 2, the front side 12 of the facing 6 includes a convex corner 30 at every juncture of a raised panel portion 20 and two of the adjacent descending surfaces 22. In order to provide sharp definition of these convex corners, the back-side die 10 is provided with a push 40 beneath each convex corner.

As seen in FIGS. 4–7, each push 40 on the back-side die 10 adjoins a raised portion 46, two upper slanting surfaces 42 and 44, and two lower slanting surfaces 54. The raised portion 46 corresponds with one of the raised panel portions 20 on the front side 12 of the facing 6. The slanting surfaces 42 and 44 each correspond with one of the descending surfaces 22 on the front side 12 of the facing. The lower slanting surfaces 54 correspond with the other descending surfaces 24 on the front side of the facing.

The slanting surfaces 42 and 44 have upper edges 50 and 56, respectively, adjoining the raised portion 46 of the back-side die 10 and lower edges 52 and 58, respectively, adjoining the lower slanting surfaces 54. The upper edges 50 and 56 extend along lines that intersect at right angles at an upper intersection point 62. The lower edges 52 and 58 extend along lines that are parallel to the upper edges and intersect at a lower intersection point 64.

In the illustrated embodiment, an outside corner 70 of the push 40 is offset outwardly and below the lower intersection point 64. Obviously, if the back-side die 10 is designed with horizontal surfaces or ascending surfaces extending from the lower edges 52 and 58, rather than the illustrated descending surfaces 54, the outside corner 70 of the push could not be offset below the lower intersection point 64. In all cases, the outside corner of the push should be disposed so as to provide a planar offset. In cases where the slanting surfaces extend farther than about ¼" from their upper edges, the lower edges 52 and 58 can be construed as occurring nearer to the upper edges of the slanting surfaces.

The push 40 has an apex 72 that is offset inwardly and above the upper intersection point 62. In the illustrated embodiment, the apex 72 is approximately 0.020"±0.003" above the upper intersection point 62. Preferably, the respective distances at which the apex 72 is disposed inwardly of the upper intersection point 62, and the outside corner 70 is disposed outwardly of the lower intersection point 64, result in a distance d shown in FIG. 5 being approximately 0.0150" for making a ⅛" thick facing from a ¾" to 1" thick fiberboard mat. In the illustrated embodiment, the apex 72 is approximately 0.0106" inward from each of the upper edges 50 and 56. For making a thicker facing from a thicker mat, the push 40 should be offset even further from the upper and lower intersection points.

The push 40 also has two intermediate corners 74 and 75 on the upper edges 50 and 56, respectively, of the slanting surfaces 42 and 44. In the illustrated embodiment, the intermediate corners are disposed approximately 0.3750" from the upper intersection point 62. The push also has lower intermediate corners 78 and 79 on the lower edges 52 and 58, respectively, of the slanting surfaces.

In the illustrated embodiment, the push 40 has three distinct principal surfaces. A triangular surface 82 extends between the apex 72 and the two intermediate corners 74 and 75. Two quadrilateral surfaces 84 and 86 extend between four points: the apex 72; one of the intermediate corners 74 and 75, respectively; one of the lower intermediate corners 78 and 79, respectively; and the outside corner 70. While in this embodiment the three surfaces 82, 84, and 86 of the push 40 are planar, the surfaces could be curved or otherwise configured so that there would be no clear distinction of three separate surfaces.

As a result of the described manufacturing process, the door facing 6 made with the illustrated back-side die 10 has, on its back side (not shown), a negative profile of the back-side die. Thus, the back side of the molded facing has two slanting surfaces corresponding to the descending surfaces 22 and 24 on the front side 12 of the facing 6 and an indentation corresponding to the shape of the push 40. Each of the slanting surfaces on the back side of the facing has upper and lower edges: the two upper edges extend along lines corresponding to the lower edges 52 and 58 of the back-side die and intersect at an upper intersection point corresponding to the lower intersection point 64 on the die 10, and the two lower edges extend along lines that correspond with the upper edges 50 and 56 on the die 10 and intersect at a lower intersection point corresponding to the upper intersection point 62 on the die 10.

The indentation on the back side of the molded facing 6 has an outside corner offset outwardly from the upper intersection point (corresponding to the lower intersection point 64 on the back-side die 10) and a nadir offset below and inwardly of the lower intersection point (corresponding to the upper intersection point 62 on the die).

While the invention has been illustrated in connection with forming a convex corner 30 in which the raised panel portion 20 has a right angle, the invention could also be applied to other convex corners.

The foregoing detailed description is given for clearness of understanding only, and no unnecessary limitations should be understood therefrom, as modifications within the scope of the invention may be apparent to those skilled in the art.

I claim:

1. A die set for a molded building product comprising:
a front-side die with a desired pattern for a face of the building product including a convex corner formed at the intersection of two surfaces slanting downward from a planar surface; and
a back-side die comprising:
two slanting surfaces corresponding to the slanting surfaces of the corner and each having upper and lower edges, the two upper edges extending along lines that intersect at an upper intersection point and the two lower edges extending along lines that intersect at a lower intersection point; and
a push extending between an outside corner offset outwardly from the lower intersection point and an apex offset above and inwardly of the upper intersection point.

2. The die of claim 1 wherein the push further comprises:
a triangular surface extending between the apex and intermediate corners on the upper edges of the slanting surfaces; and
two quadrilateral surfaces extending between the apex, the outside corner, a respective one of the intermediate corners, and a lower intermediate corner on a respective lower edge of one of the slanting surfaces.

3. The die of claim 1 wherein the upper edges of the slanted surfaces are at right angles, and each of the lower edges is parallel to its corresponding upper edge.

4. The die of claim 1 in which the slanting surfaces slant downward at an angle of approximately 38°.

5. The die of claim 1 in which the apex is approximately 0.020" above the upper intersection point.

6. The die of claim 1 wherein the slanting surfaces are planar.

7. The die of claim 1 wherein the push further extends between two intermediate corners on the upper edges of the slanting surfaces, about 0.375" from the upper intersection point.

8. The die of claim 1 wherein:
a) the molded building product is a door facing;
b) the apex is approximately 0.020" above the upper intersection point;
c) the push further comprises:
1) a triangular surface extending between the apex and intermediate corners on the upper edges of the slanting surfaces, about 0.375" from the upper intersection point; and
2) two quadrilateral surfaces extending between the apex, the outside corner, a respective one of the intermediate corners, and a lower intermediate corner on a respective lower edge of one of the slanting surfaces; and d) the slanting surfaces:
 1) are planar;
 2) have upper edges at right angles to each other;
 3) have lower edges that are each parallel to their corresponding upper edges; and
 4) slant downward at an angle of approximately 38°.

* * * * *